US005964336A

United States Patent [19]

Itako et al.

[11] Patent Number: 5,964,336

[45] Date of Patent: Oct. 12, 1999

[54] BILL IDENTIFYING APPARATUS AND A BILL IDENTIFYING METHOD

[75] Inventors: Eiji Itako; Yukio Ito, both of Sakado, Japan

[73] Assignee: Nippon Conlux Co., Ltd., Tokyo, Japan

[21] Appl. No.: 08/892,635

[22] Filed: Jul. 15, 1997

[30] Foreign Application Priority Data

Jul. 15, 1996 [JP] Japan .................................... 8-202824
Jul. 15, 1996 [JP] Japan .................................... 8-204150

[51] Int. Cl.[6] .............................. G06K 7/10; G06K 5/00; B07C 5/342

[52] U.S. Cl. .......................... 194/207; 209/534; 209/567; 209/577; 250/556; 382/135

[58] Field of Search .................................... 194/206, 207; 209/534, 577, 567; 250/556; 382/135

[56] References Cited

U.S. PATENT DOCUMENTS 3,457,421 7/1969 Bayha .................................... 250/556
5,222,584 6/1993 Zouzoulas .............................. 194/207
5,657,846 8/1997 Schwartz ................................ 194/206
5,662,201 9/1997 Gerlier et al. .......................... 194/206

*Primary Examiner*—Christopher P. Ellis
*Assistant Examiner*—Bryan Jaketic
*Attorney, Agent, or Firm*—Koda & Androlia

[57] ABSTRACT

A sensor section for obtaining identification data from a bill passing through a bill transfer path can selectively be mounted in a plurality of positions on the body of a bill identifying apparatus. The sensor section is mounted in one of the mounting positions, and a certain region of the bill passing through the transfer path is sensed by means of a sensor section to obtain identification data. When the use of forged bill is identified by the bill identifying apparatus, or after the machine has been used for a predetermined time, the mounting position of the sensor section is changed to another one. Thereupon, the sensor section senses other region of the bill passing through the transfer path to obtain identification data. Thus, the sensor section can easily cope with the use of the counterfeit bill even if the bill identifying apparatus is designed to be capable of sensing only a part of the whole area of the bill.

13 Claims, 13 Drawing Sheets

BILL IDENTIFYING APPARATUS AND A BILL IDENTIFYING METHOD

BACKGROUND OF THE INVENTION

1. Field of the Invention

The present invention relates to a bill identifying apparatus used in an automatic vending machine, money changer, game machine, etc. and a bill identifying method by the identifying apparatus.

2. Description of the Related Art

In a bill identifying apparatus used in an automatic vending machine or the like, a bill inserted through a bill slot is transferred to a bill storage section by transfer means. A sensor section, composed of a magnetic or optical sensor, is provided on a transfer path in the identifying apparatus. Synchronously with the transfer of the bill along the path, the magnetic sensor detects identification data such as a magnetic pattern contained in printing ink on the bill, and/or the optical sensor detects identification data such as a pattern indicative of the quantity of light transmitted through the bill. Based on these identification data, the bill is checked for authenticity and denomination (see Laid-Open Japanese Patent Application Nos. 6-195543 and 7-92853).

Conventionally, sensor components, such as magnetic heads that constitute magnetic sensors, light emitting elements and light receiving elements that constitute optical sensors, etc., are mounted directly on the body of bill identifying apparatuss.

In a bill identifying apparatus built in an automatic vending machine, money changer, or the like, a sensor section must be located on a bill transfer path. Consequently, positions in which magnetic and optical sensors are to be arranged are restricted, so that a bill cannot be measured and identified all through. If the whole area of the bill is expected to be measured, the magnetic and optical sensors has to be increased in number, and circuit components so that identification data detected by the sensors and reference data, such as patterns for reference can be set and stored for each of the sensors, and these data can be compared. This, however, will cause a high manufacturing cost.

If the sensors are reduced in number, measuring spots on the bill for the detection of the identification data will become more limited, and this will make it easier for some evil-minded people who may study the construction of the bill identifying system, especially bill measuring positions for bill identification, to create forged or altered bills that can pass the identifying apparatus without being rejected. Conventionally, to cope with the bills forged or altered with sophisticated cunningness, the identifying accuracy of the identifying apparatus is used to be raised correspondingly. If the identifying accuracy is raised, however, some stained or crumpled authentic bills may possibly be mistaken for counterfeit ones and rejected, producing an adverse effect such as the fall of bill acceptance efficiency.

In these bill identifying apparatuses placed in a severe environment, such as those attached to outdoor vending machines and the like, sensor components for identification suffer a lot of detrimental influences. In general, therefore, identifying apparatuses on vending machines that are located in bad surroundings have shorter lives than those of other vending machines. If the sensor components go wrong, they require maintenance service such that the wrong identifying apparatus is removed from the automatic vending machine for disassembling at a shop or the like, the wrong sensor components are replaced with new ones, and the identifying apparatus has to be reassembled and incorporated into the vending machine.

OBJECTS AND SUMMARY OF THE INVENTION

The object of the present invention is to provide a bill identifying apparatus and a bill identifying method for easier maintenance operation and easier check for counterfeit bills.

A bill identifying apparatus according to the present invention is designed so that a sensor section for obtaining identification data from a bill can be mounted alternatively in a plurality of positions with respect to a bill transfer path in the body of a identifying apparatus. The sensor section detects only a part of the bill and obtains the identification data therefrom. If the location of installed sensor section is changed, the bill identification data detected by the sensor section will vary correspondingly. Hence, even though the bill identifying apparatus is constructed so that sensors for obtaining the identification data from the bill are reduced in number to obtain the data from only a part of the bill, not the whole area of the bill, it can easily cope with use of counterfeit bills based on the knowledge about the number of the sensors.

In an aspect of the bill identifying apparatus according to the invention, a sensor section for obtaining identification data from a bill is unitized, and the unitized sensor section is removably mounted on the body of the bill identifying apparatus. Thus, the sensor section can be attached and detached with ease, so that use of counterfeit bills can be prevented readily by replacing sensors with different ones.

BRIEF DESCRIPTION OF THE DRAWINGS

The foregoing and other objects and feature of the invention will become apparent from the following description of preferred embodiments of the invention with respect to the accompanying drawings, in which.

DETAILED DESCRIPTION OF THE PREFERRED EMBODIMENTS

Referring first to FIGS. 1 to 6, a first embodiment of the present invention will be described.

Figure 1:
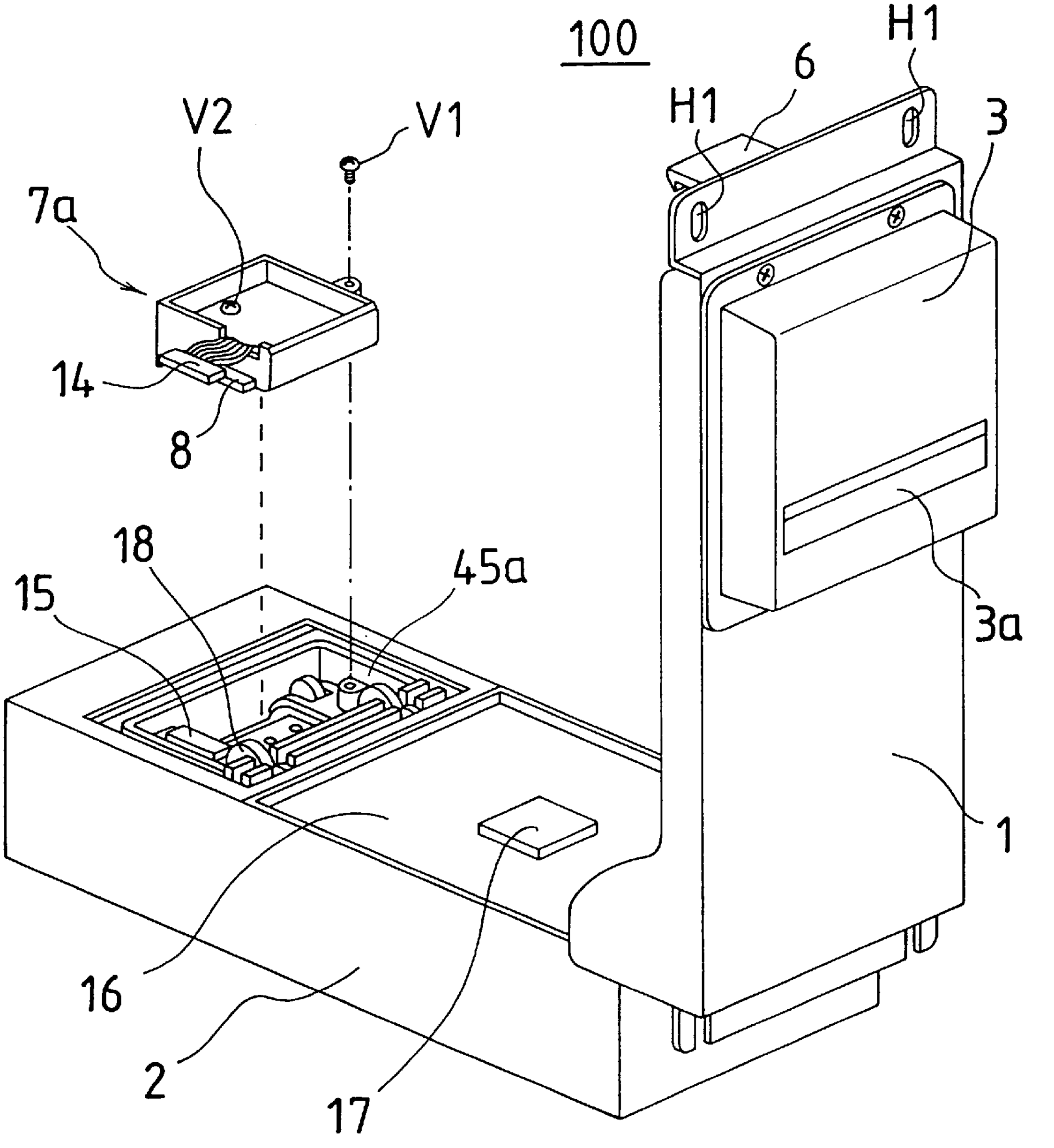
FIG. 1 is a perspective view showing a bill identifying apparatus according to a first embodiment of the present invention with its front open.

A bill identifying apparatus 100 comprises a mounting plate 1 and a bill identifying apparatus body 2. A shaft 5 (see FIG. 4) is fixed to a lug 4 that is formed on the bottom portion of the mounting plate 1, and mounting pieces 50 are formed on the bottom portion of the apparatus body 2. Thus, the bill identifying apparatus body 2 can be tilted rearward from the mounting plate 1 around the shaft 5, as shown in FIG. 1.

Figure 2:
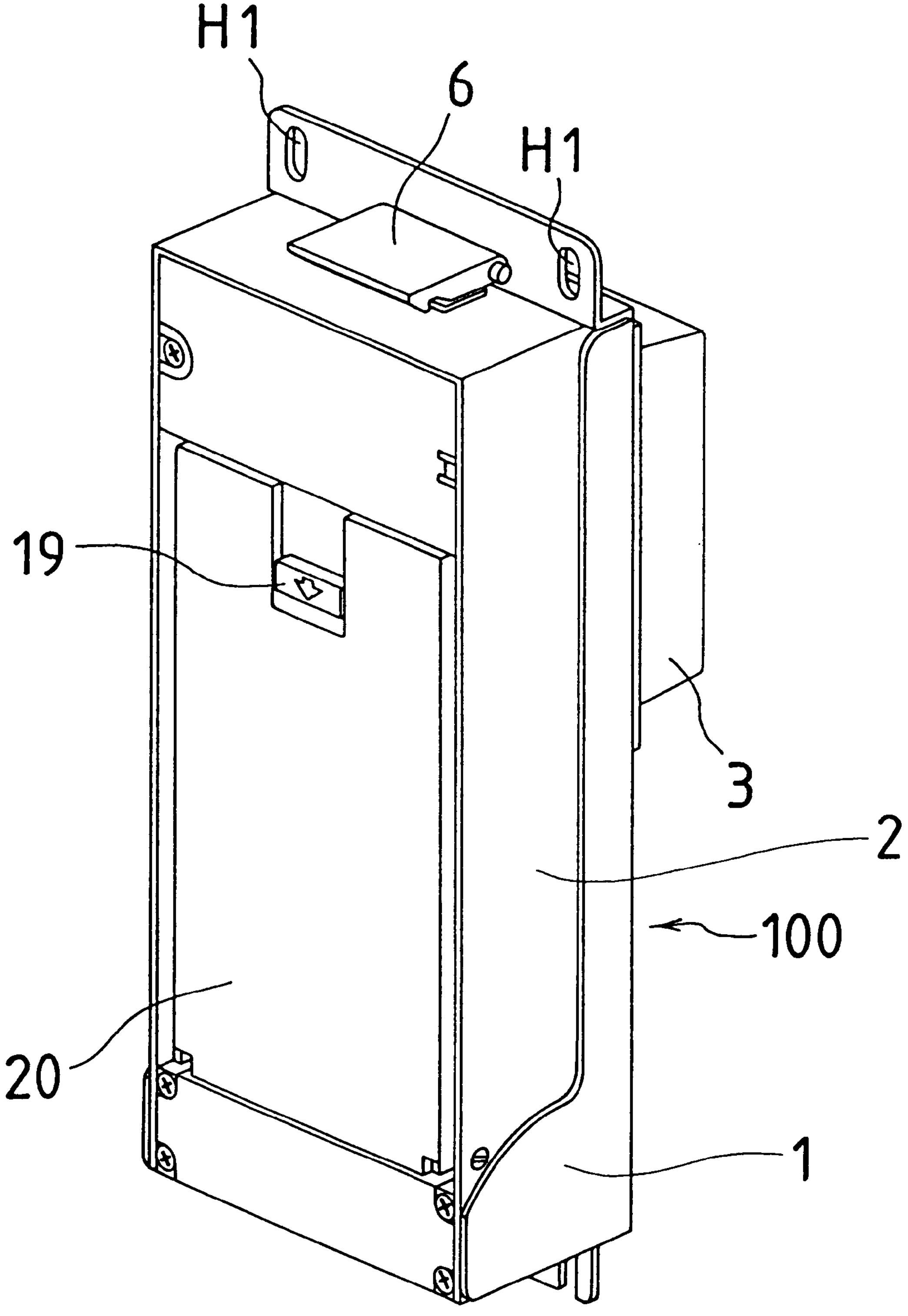
FIG. 2 is a perspective view of the bill identifying apparatus of FIG. 1 viewed from its rear side.
Figure 4:
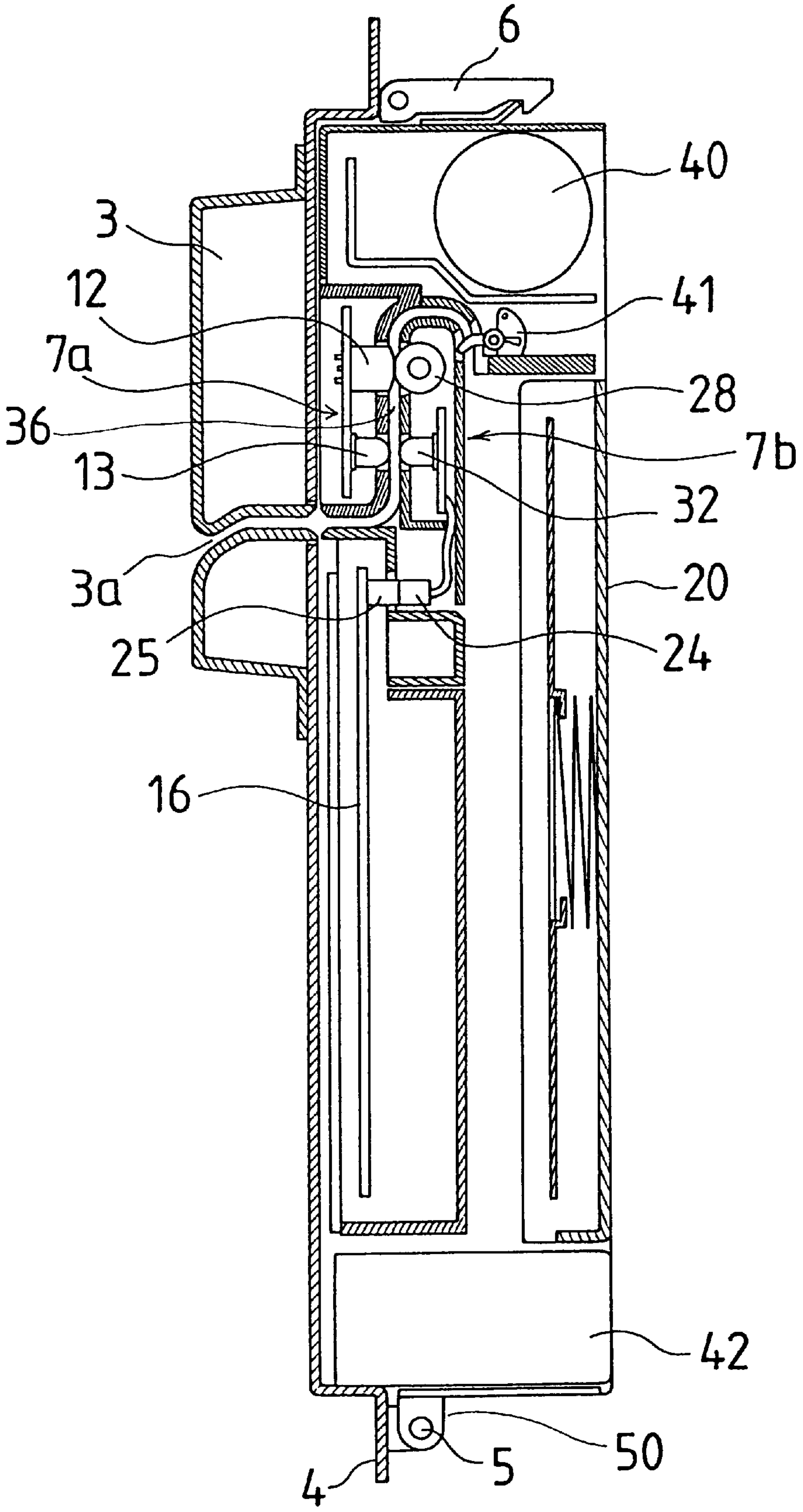
FIG. 4 is a central vertical sectional view of the bill identifying apparatus of FIG. 1.

A latch mechanism 6 is provided on both the top portions of the mounting plate 1 and the bill identifying apparatus body 2 respectively. As shown in FIGS. 2 and 4, the mounting plate 1 and the apparatus body 2 are kept closely attached to each other by the latch mechanism 6. A front mask portion 3 is fixed to the front face of the mounting plate 1. The mask portion 3 is provided with a bill slot 3*a*.

In attaching the bill identifying apparatus 100 to an apparatus such as an automatic vending machine, the lug 4 on the bottom portion of the mounting plate 1 is inserted into a mounting hole of a casing (not shown) of the apparatus, and the machine 100 is fixed to the apparatus casing by means of mounting screws and the like that are passed through holes H1 at the upper portion of the mounting plate 1. In this state, the front mask portion 3 needs to be exposed outside from the front face of the apparatus or automatic vending machine.

Sensors for detecting authenticity checking data from bills are unitized, comprising a front-side sensor unit 7*a* on the front side (outside) of a bill transfer path 36, (see FIG. 4, to be described later) in the identifying apparatus body 2, and a rear-side sensor unit 7*b* on the rear side (inside) of the path 36.

As shown in FIG. 1, provided on the front side of the identifying apparatus body 2 is an attachment section 45*a* whereby the front-side sensor unit 7*a* is received and attached to the apparatus body 2. When a mounting screw V1 is tightened with a guide rib 8 of the sensor unit 7*a* fitted in a groove (not shown) in the attachment section 45*a*, the sensor unit 7*a* is fixed to the identifying apparatus body 2 through the attachment section 45*a*. In FIG. 1, numeral 18 denotes a transfer roller for transfering bills.

Figure 5:
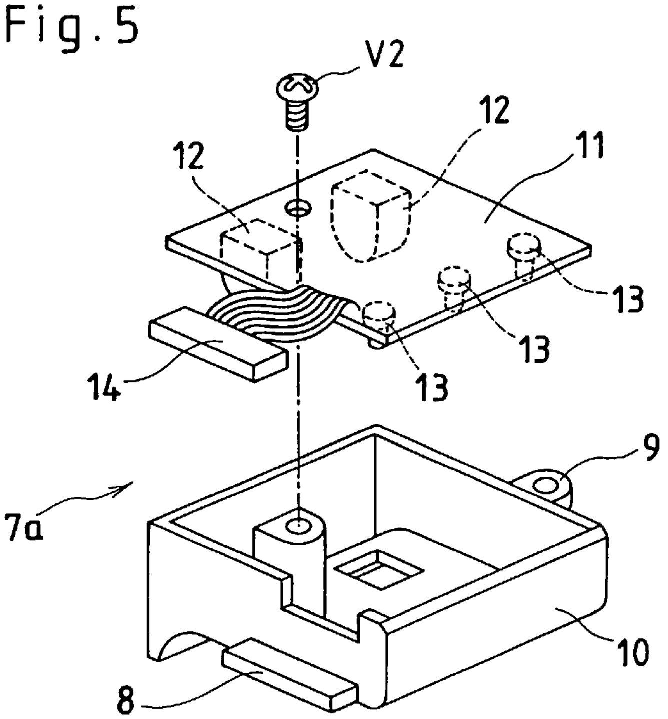
FIG. 5 is an exploded view of a front-side sensor unit in the bill identifying apparatus of FIG. 1.

Referring now to FIG. 5, the construction of the front-side sensor unit 7*a* will be described.

The front-side sensor unit 7*a* is composed of a sensor casing 10 and a sensor board 11. One side plate that constitutes the sensor casing 10 is provided with a mounting piece 9 formed with a hole through which the mounting screw V1 (see FIG. 1) is to be driven. Further, the guide rib 8 (see FIG. 1) is provided on the side plate of the sensor casing 10 which is opposed to the side plate having the mounting piece 9 thereon.

The sensor board 11 has a size fitting just in the sensor casing 10, and is fixed in the casing 10 by means of a mounting screw V2. The sensor board 11 has circuit wiring printed thereon, and, further a pair of magnetic heads 12, which constitute a magnetic sensor, and three light emitting elements 13 are fixed thereto by soldering or the like. The light-emitting elements 13 are light emitting diodes that form an optical sensor. Conductor wires that are connected to the magnetic sensor (magnetic heads 12) and the optical sensor (light emitting elements 13) are jointly coupled to a relay harness 14.

According to the front-side sensor unit 7*a* constructed in this manner, the magnetism of two lines on each bill is detected by two magnetic heads 12, and the transmitted light of three lines are detected by the three light emitting elements 13, respectively, as the bill passes through the bill transfer path 36.

When the front-side sensor unit 7*a* is attached to the attachment section 45*a* of the bill identifying apparatus body 2, the relay harness 14 is inserted into a trunk connector 15 (see FIG. 1) of the attachment section 45*a*, whereby it is connected electrically to a control board 16 that belongs to the apparatus body 2. A microchip computer 17 is removably mounted on the control board 16 in a plug-and-socket fashion.

On the other hand, as shown in FIG. 4, the bill identifying apparatus body 2 is provided with a bill storage section 20. The storage section 20 is pivotally supported with respect to the apparatus body 2 by a pivotal portion (not shown) at its lower end. Provided at the back of the body 2 of the bill identifying apparatus is a latch mechanism 19 (see FIG. 2) for keeping the bill storage section 20 held close to the apparatus body 2. When the latch mechanism 19 is operated to release a latch, the bill storage section 20 tilts around the pivotal portion at its lower end, whereupon it is released, as shown in FIG. 3.

Figure 3:
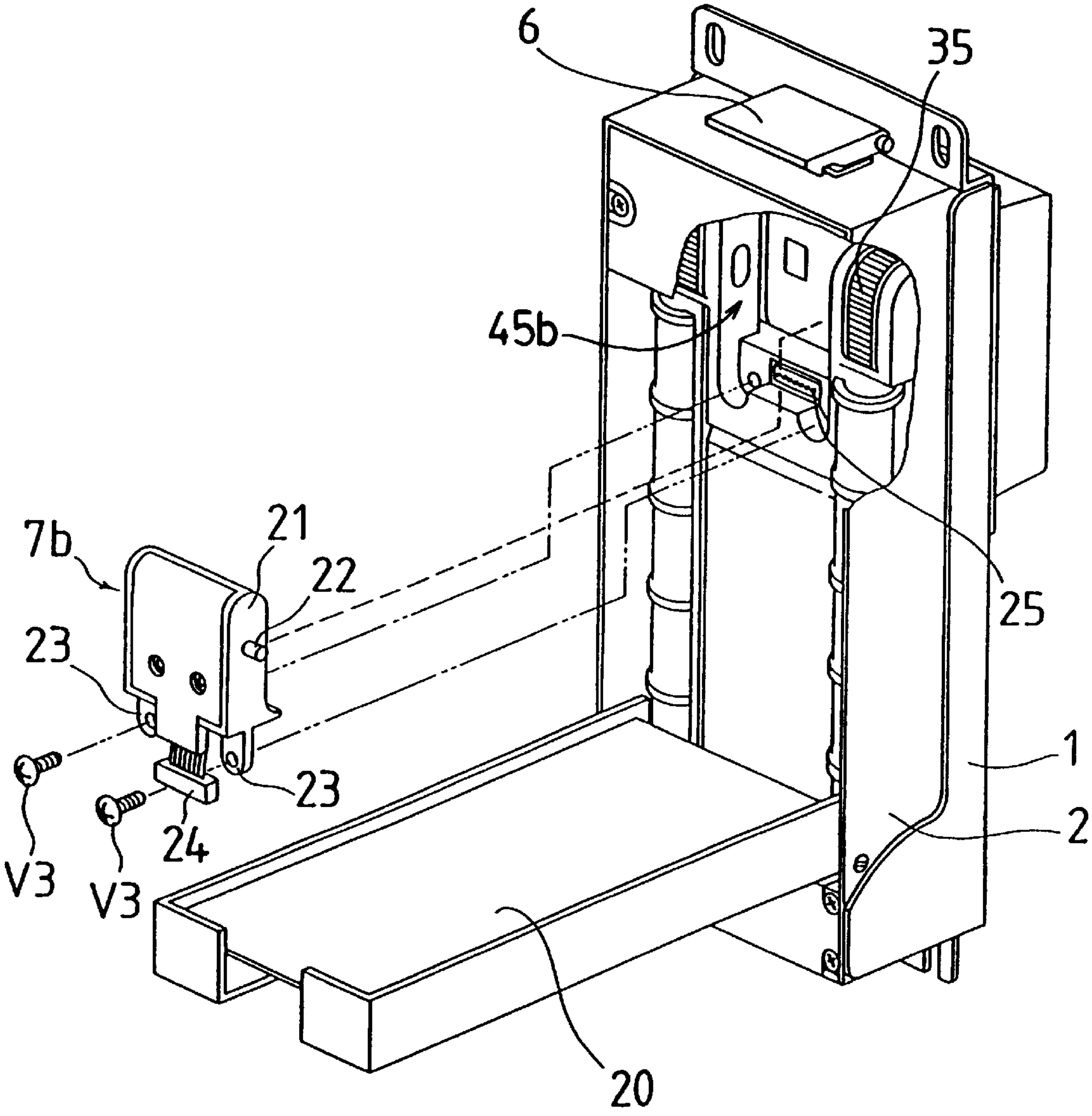
FIG. 3 is a perspective view of the bill identifying apparatus of FIG. 1 with its bill storage section open.

Provided on the rear side of the apparatus body 2 is an attachment section 45*b* to be fitted with the rear-side sensor unit 7*b*, as shown in FIG. 3. The bill storage section 20 has to be opened when attaching the sensor unit 7*b* to the attachment section 45*b*.

As shown in FIG. 3, the whole rear-side sensor unit 7*b* is housed in a casing 21. A guide boss 22 protrudes from one side face of the casing 21, and a pair of mounting pieces 23 from the underside. After inserting the boss 22 of the sensor unit 7*b* into a guide groove on the side of the bill identifying apparatus body 2 and positioned, mounting screws V3 are passed individually through holes in the mounting piece 23 and tightened. Thereupon, the sensor unit 7*b* is fixedly attached to the attachment section 45*b* of the identifying apparatus body 2. Then, a relay harness 24 of the sensor unit 7*b* is coupled, by insertion, to a connector 25 on the apparatus body 2, whereby the sensor unit 7*b* is connected electrically to the control board 16. In FIG. 3, numeral 35 denotes each of a pair of conveyor belts for transfering the bills.

Figure 6:
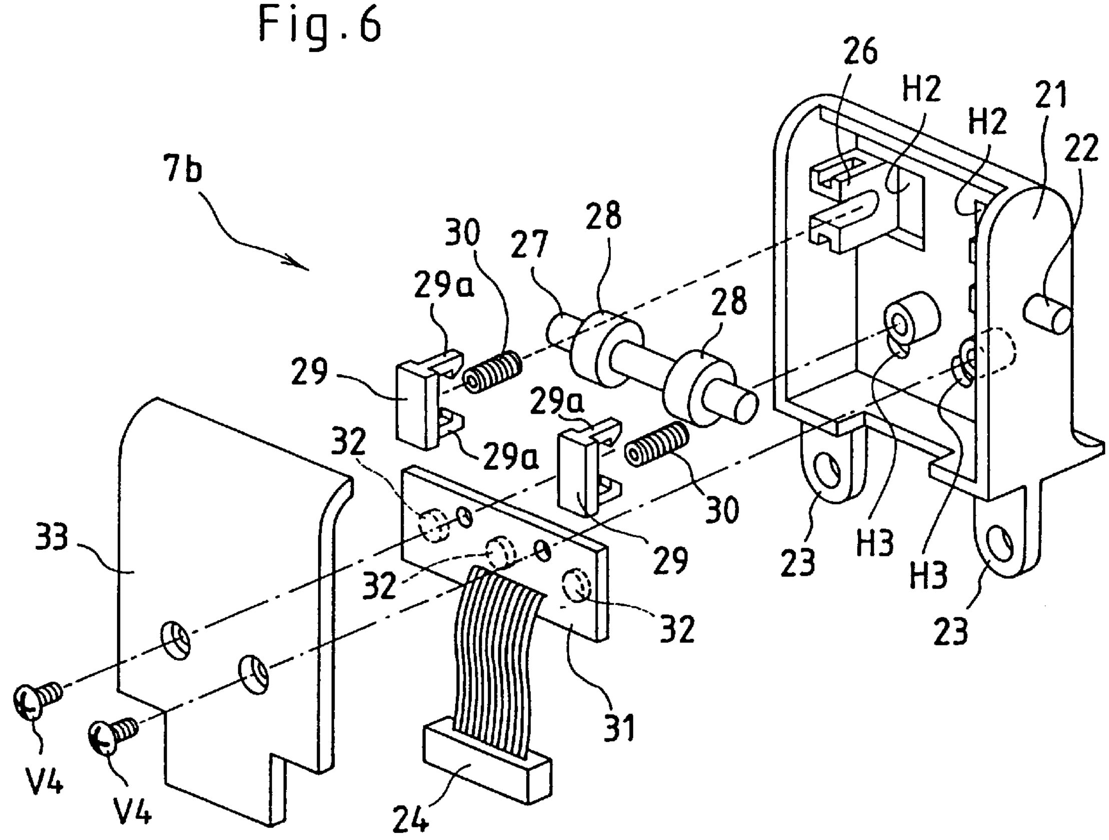
FIG. 6 is an exploded view of a rear-side sensor unit in the bill identifying apparatus of FIG. 1.

Referring now to FIG. 6, the construction of the rear-side sensor unit 7*b* will be described.

The bottom (opposite to the front-side sensor unit 7*a*) of the casing 21 of the rear-side sensor unit 7*b* is provided with two laterally arranged holes H2 and other three holes H3 arranged laterally thereunder (only two of which are shown in FIG. 6). The two holes H2 are opposed individually to the magnetic heads 12 of the front-side sensor unit 7*a*, while the three holes H3 are opposed individually to the light emitting elements 13 of the sensor unit 7*a*. Further, a pair of shaft guides 26 (only one of which is shown in FIG. 6) erect respectively from those areas of the inner surface of the bottom of the casing 21 adjacent to the holes H2.

Each shaft guide 26 is formed with a groove in which a shaft 27 having a pair of magnetic head backup rollers 28 can be loosely fitted. On the other hand, each of a pair of shaft brackets 29 has an elastically deformable claw 29*a* on each end thereof. The shaft 27, loosely fitted in the respective grooves of the shaft guides 26, is supported for rotation with each claw 29*a* in engagement with an engaging hole in its corresponding shaft guide 26. Also, the shaft 27, supported in the grooves of the shaft guides 26 by means of the shaft brackets 29, is pushed toward the bottom of the casing 21 by springs 30 interposed between itself and the brackets 29. Thus, part of each magnetic head backup roller 28 on the shaft 27 presses its corresponding magnetic head 12 of the front-side sensor unit 7*a* through its corresponding hole H2, as shown in FIG. 4. More specifically, each backup roller 28 partially projects into the bill transfer path 36, and faces its corresponding magnetic head 12 that also partially projects into the path 36.

Further, a sensor board 31 and a sensor cover 33 are attached together to the casing 21 of the rear-side sensor unit 7*b* by means of a pair of mounting screws V4. Three light receiving elements (phototransistors) 32 are fixed to the sensor board 31 by soldering. When the sensor board 31 is fixed to the casing 21, as shown in FIG. 4, the three light receiving elements 32 individually face the three light emitting elements 13 of the front-side sensor unit 7*a* across the bill transfer path 36. Thus, three light beams from the three light emitting elements 13 of the sensor unit 7*a* are transmitted through each bill passing the path 36, and pass respectively the three holes H3 in the bottom of the casing 21 of the rear-side sensor unit 7*b*. Then, the light beams are received by the light receiving elements 32, respectively. Patterns of the received light quantities are detected as identification data, and the bill is checked for authenticity and denomination on the basis of these identification data. Conductor wires to be connected to the light receiving elements 32 are collected together by means of the relay harness 24, and are connected electrically to the control board 16 through the connector 25.

Referring now to FIG. 4, the operation of the bill identifying apparatus 100 will be described in brief.

When a bill inserted through the bill slot 3*a* is detected, a bill transfering section 40 of the bill identifying apparatus 100 starts to operate, thereby driving the conveyor belts 35 (see FIG. 3), transfer roller 18 (see FIG. 1), etc. to transfer the bill along the transfer path 36. The bill passes between the three light emitting elements 13 and the three light receiving elements 32, and is pressed against the two magnetic heads 12 by the two magnetic head backup rollers 28 as it is transfered along the path 36. During this process of bill transfer, the light receiving elements 32 receive light beams emitted individually from the light emitting elements 13 and transmitted through the bill, and the magnetic heads 12 detect the magnetism of the bill. As a result, identification data on patterns of the quantities of received light with respect to the lines on the bill along the transfer path 36 which correspond to the respective positions of the light receiving and emitting elements, are obtained from the light receiving elements 32. The magnetic heads 12 also obtain identification data on magnetic patterns with respect to the lines on the bill in the corresponding positions. The identification data are delivered to the microchip computer 17.

The microchip computer 17 is previously stored with reference data for discrimination based on light quantity patterns and magnetic patterns to be detected in authentic bills so that the microchip computer 17 will be able to discriminate an authentic bill from a forged bill based on the detected identification data and the reference data.

The result of identification is outputted before the tailing end of the bill passes the position of a stopper lever 41. If the bill is concluded to be unfit or false, the feed of transfering means of the bill transfering section 40 is reversed so that the bill is fed back toward the bill slot. On the other hand, when the bill is concluded to be fit or authentic, it is transfered directly to the bill storage section 20. When the bill reaches the storage section 20, bill storing means 42 starts to operate, thereby storing the bill into the storage section 20.

The bill transfering means, bill storing means, and microchip computer 17 of the present invention for checking the bills for authenticity are used in the same manner as in the conventional bill identifying apparatus. Therefore, a detailed description of the constructions and operations of these means is omitted.

If any of the sensor sections, such as the magnetic heads 12, light emitting elements 13, light receiving elements 32, etc., is in trouble, the sensor units 7*a* and 7*b* must be replaced with new ones. According to the present invention, such replacement can be done easily.

In inspecting the front-side sensor unit 7*a*, a latch (see FIG. 2) of the latch mechanism 6 is released to disengage the bill identifying apparatus body 2 from the mounting plate 1 (state of FIG. 1). In this state, the mounting screw V1 is removed, and the sensor unit 7*a* is taken out of the apparatus body 2. Further, the mounting screw V2 is removed to disengage the sensor board 11 from the sensor casing 10, and both the magnetic heads 12 and the light emitting elements 13 are checked if they are in trouble. If any of these elements is out of order, the sensor unit 7*a* or the sensor board 11 itself is replaced with a new one.

In inspecting the rear-side sensor unit 7*b*, the latch of the latch mechanism 19 (see FIG. 2) is released to disengage the bill storage section 20 from the bill identifying apparatus body 2 (state of FIG. 3). In this state, the mounting screw V3 is removed, and the sensor unit 7*b* is taken out of the apparatus body 2. Further, the mounting screw V4 is removed to disengage the sensor unit cover 33 from the sensor unit casing 21, and the sensor board 31 is taken out of the casing 21. Then, the light receiving elements 32 are inspected. If the elements 32 are in trouble, it is necessary only that the rear-side sensor unit 7*b* or the sensor board 31 be replaced with a new one.

When the latch mechanism 6, which is attached to both the bill identifying apparatus body 2 and the mounting plate 1 that constitute the identifying apparatus 100, and the latch mechanism 19, which is attached to the apparatus body 2, are released as described above, the front- and rear-side sensor units 7*a* and 7*b* on the opposite sides of the bill transfer path respectively become accessible for an operator. Thus, the sensor units 7*a* and 7*b* can easily be disengaged from the identifying apparatus body 2 by loosening the mounting screws V1 and V3 that are fixed to the body 2. Thus, the sensor units 7*a* and 7*b* can be inspected, repaired, replaced, and mounted very easily.

If a counterfeit bill has passed the bill identifying apparatus 100 without being detected, both the sensor units 7*a* and 7*b* have to be replaced with new ones. The new sensor units 7*a* and 7*b* for replacement will be those whose bill inspection lines are changed from or made larger in number than those of the old sensor units. In these new sensor units for replacement, the locations of the light emitting and receiving elements 13 and 32 relative to each bill or locations of the magnetic heads 12 and the magnetic head backup rollers 28 are changed, or the numbers of the elements 13 and 32 and/or the numbers of the heads 12 arid the rollers 28 are increased.

Thus, when the sensor units 7*a* and 7*b* are replaced with modified ones, the bill inspection lines vary, so that the identification data detected by the light receiving elements 32 differ from the data detected by the light-receiving elements 32 and the magnetic heads 12. Therefore, the microchip computer 17, which are stored with reference data for verification corresponding to the new sensor units 7*a* and 7*b*, must also be replaced. Since the computer 17 is inserted in a socket when it is mounted, its replacement is also very easy. Further, if the computer 17 has a large capacity, different reference data corresponding to different sensor units 7*a* and 7*b*, in which the mounting positions or numbers of the light emitting and receiving elements 13 and 32 and those of the magnetic heads 12 are differentiated, are stored therein so that different sensor units 7*a* and 7*b* are identified by connector wiring signals, and the reference data are selectively changed automatically. Alternatively, reference data corresponding to the replacing sensor units may be selected by means of changeover switches or the like.

Further alternatively, ROMs stored with reference data may be provided in advance for the individual differentiated sensor units so that they can be replaced correspondingly in a plug-and-socket fashion.

Furthermore, a plurality of sensor units with varied sensor positions and numbers and the ROMs and microchip computers (only one microchip computer will do if it is loaded with different reference data for the different sensor units) corresponding to the sensor units may be prepared as different sets. In this case, the sensor units can be replaced at regular or irregular intervals, and the reference data can also be changed correspondingly by replacing the ROMs, microchip computers, etc. If this is done, those who have an evil intention to use forged bills will not be able to grasp the criteria of identification of the bill identifying apparatuses, making them give up their attempts.

As described above, according to the first embodiment of the present invention, the sensor for detecting data for verifying the authenticity of bills and the like are unitized in order to be detachable and replaceable, so that the sensor can easily undergo maintenance or repair on the site of the automatic vending machine or the like without dismounting the bill identifying apparatus from the machine.

Further, if there is any counterfeit bill or the like which has passed the identifying apparatus, recurrence of the same can easily be prevented by replacing the sensor units with ones differing as to positions or number of inspecting positions and by replacing authenticity reference data with ones corresponding to the replacing sensor units. Furthermore, by carrying out such replacement at regular or irregular intervals, a counterfeiter's forging operation can be made difficult, and counterfeiting can be prevented.

Thus, using the same apparatus body, bill identifying apparatuss with different identifying performances can be made available by incorporating differentiated sensor units or the like (e.g., sensors varying in the number of spots which they are able to cover). Thus, bill identifying apparatuses with various identifying functions ranging from low performance to high performance can be made available at low cost.

Even when the newly designed bills to replace the old bills currently in circulation are issued, the positions of the sensor units and the reference data can easily be adjusted for the identification of the new bills at low costs by replacing the sensor units and reference data correspondingly.

Referring now to FIGS. 7 to 15, a second embodiment of the present invention will be described.

Figure 7:
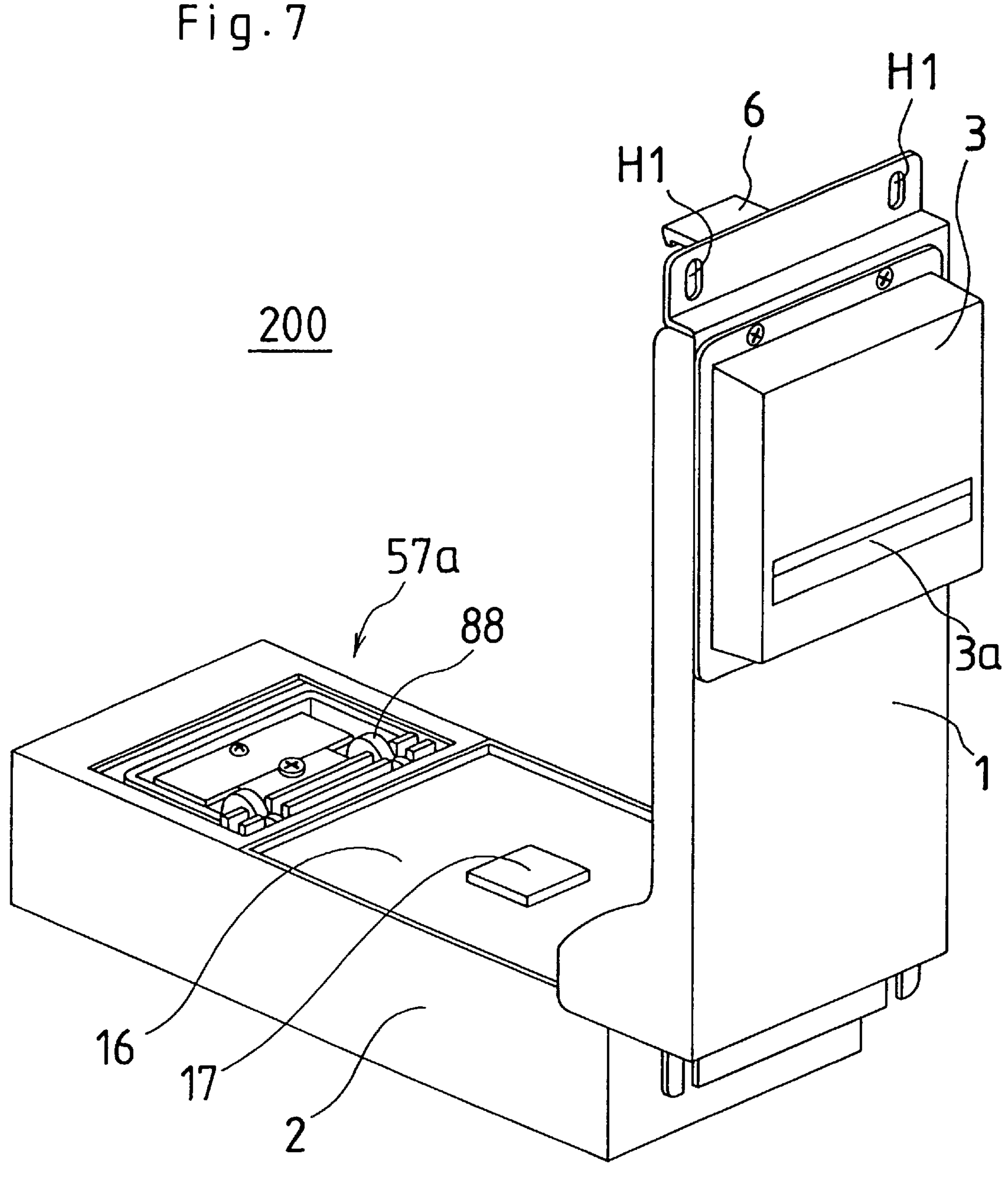
FIG. 7 is a perspective view showing a bill identifying apparatus according to a second embodiment of the present invention with its front open.

As shown in FIG. 7, a bill identifying apparatus 200 comprises a mounting plate 1 and a bill identifying apparatus body 2. A shaft 5 (see FIG. 10) is fixed to a lug 4 that is formed on the bottom portion of the mounting plate 1, and mounting pieces 50 are formed on the bottom portion of the apparatus body 2 so that the bill identifying apparatus body 2 can be tilted rearward from the mounting plate 1 around the shaft 5.

Figure 8:
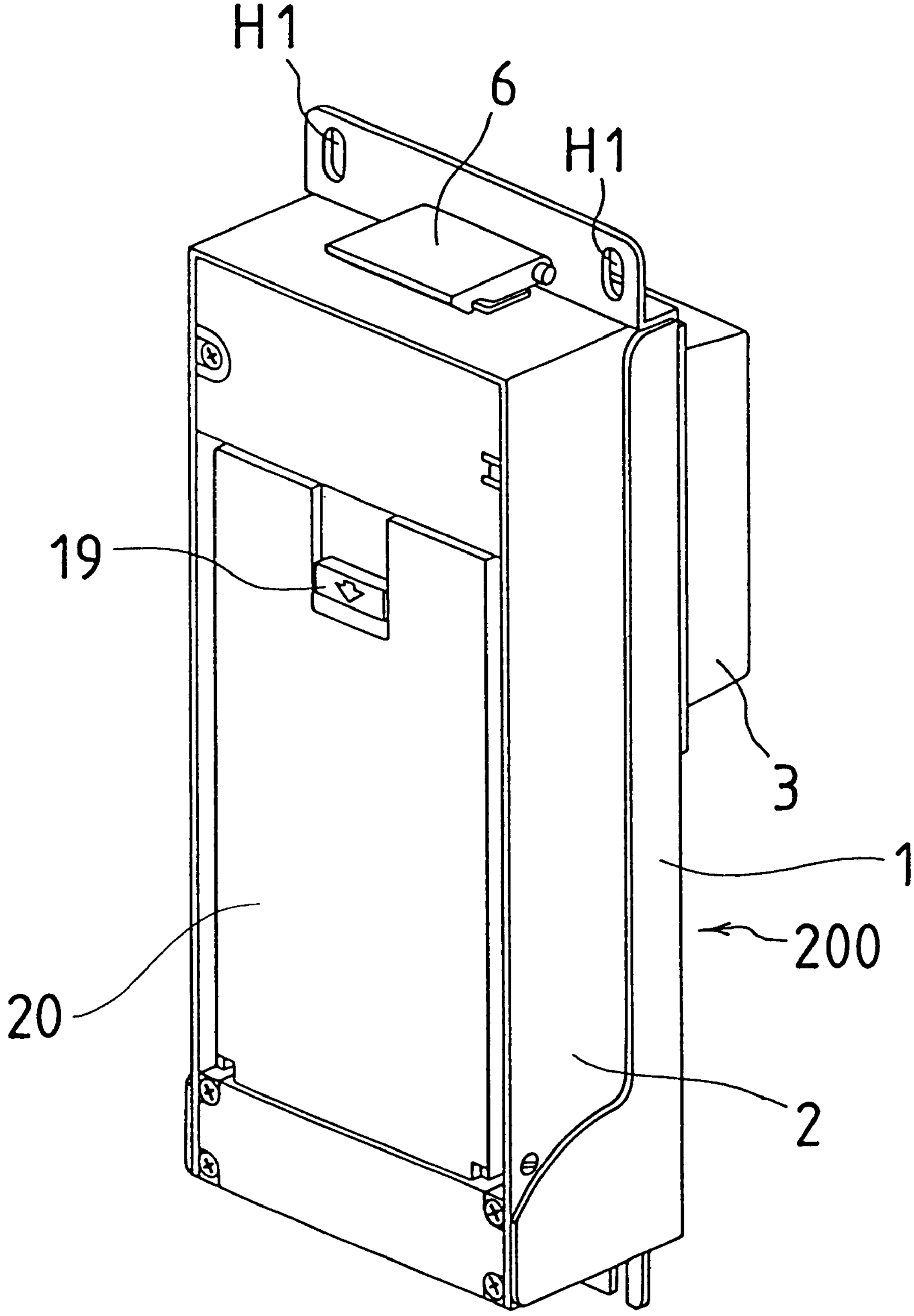
FIG. 8 is a perspective view of the bill identifying apparatus of FIG. 7 viewed from its rear side.
Figure 10:
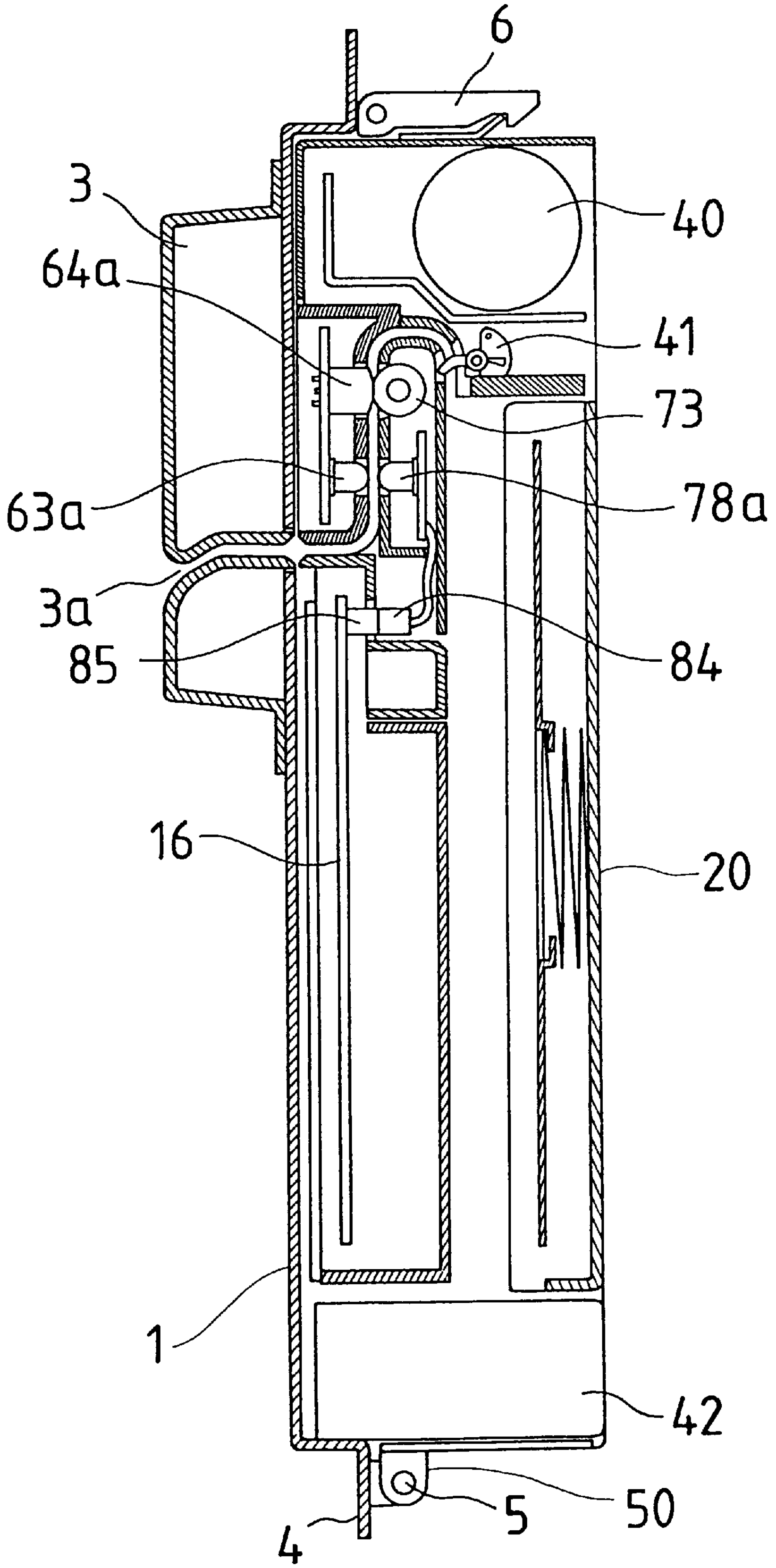
FIG. 10 is a central vertical sectional view of the bill identifying apparatus of FIG. 7.

A latch mechanism 6 is provided on the respective top portions of the mounting plate 1 and the bill identifying apparatus body 2. As shown in FIGS. 8 and 10, the mounting plate 1 and the apparatus body 2 are kept attached to each other by the latch mechanism 6. A front mask portion 3 is fixed to the front face of the mounting plate 1. The mask portion 3 is provided with a bill slot 3*a*.

In attaching the bill identifying apparatus 200 to an apparatus such as an automatic vending machine, the lug 4 on the bottom portion of the mounting plate 1 is inserted into a mounting hole of a casing (not shown) of the apparatus, and the machine 200 is fixed to the apparatus casing with mounting screws and the like through holes H1 at the upper portion of the mounting plate 1. In this state, the front mask portion 3 is exposed on the front face of the apparatus or automatic vending machine.

As shown in FIG. 7, a control board 16 as control means for the bill identifying apparatus is attached to the front side of the bill identifying apparatus body 2. This control board 16 is fitted with a microchip computer 17 for controlling the identifying apparatus. A ROM of the computer 17 is stored with two kinds of reference data for verifying the authenticity of bills, as mentioned later. An attachment section 57*a* for a front-side sensor section 60*a* is provided on the front side of the identifying apparatus body 2. The sensor section 60*a* is paired with a rear-side sensor section 60*b*, thereby forming sensor means, which will be described later.

Referring now to the exploded view of FIG. 11, the front-side sensor section 60*a* and the attachment section 57*a* therefor will be described.

The front-side sensor section 60*a* is composed of first and second sensor boards 61 and 62. The first sensor board 61 is fitted with two light emitting elements (light emitting diodes) 63*a* and 63*b* that are arranged leaving a predetermined space. The second sensor board 62 is fitted with two magnetic heads 64*a* and 64*b* and one light emitting element (light emitting diode) 63*c*. From the attachment section 57*a* protrude a pair of guide bosses 65*a* and 65*b*, which are arranged leaving a predetermined space.

The first sensor board 61 is formed with a first pair of engaging holes H2*a* and H2*b*, which are arranged leaving a space equal to the space between the guide bosses 65*a* and 65*b*, and a second pair of engaging holes H3*a* and H3*b*, which are arranged leaving a space equal to the space between the holes H2*a* and H2*b* and shifted for a given distance d therefrom in one direction. A slot H4 is formed through a longitudinal intermediate portion of the first sensor board 61.

Thus, the first sensor board 61 can be attached to the attachment section 57*a* by making the first pair of engaging holes H2*a* and H2*b* or the second pair of engaging holes H3*a* and H3b of the sensor board 61 engage the guide bosses 65a and 65b of the section 57a, respectively. Then, the first or second pair of engaging holes, H2a and H2b or H3a and H3b, of the sensor board 61 are made respectively to engage the guide bosses 65a and 65b of the attachment section 57a, and a mounting screw B1 is passed through the slot H4 and a spring 66, which may be either a coil spring or leaf spring, to be screwed into a tapped hole in a screw bearing portion 67 of the attachment section 57a. Thereupon, the first sensor board 61 is attached to the attachment section 57a, and is held in position by the urging force of the spring 66.

Further, a pair of slots H6a and H6b are formed through the attachment section 57a, opposing to the light emitting elements 63a and 63b, respectively, on the sensor board 61. Light beams from the elements 63a and 63b are made to fall on the bill transfer path 36 and the bill passing the transfer path.

Figure 11:
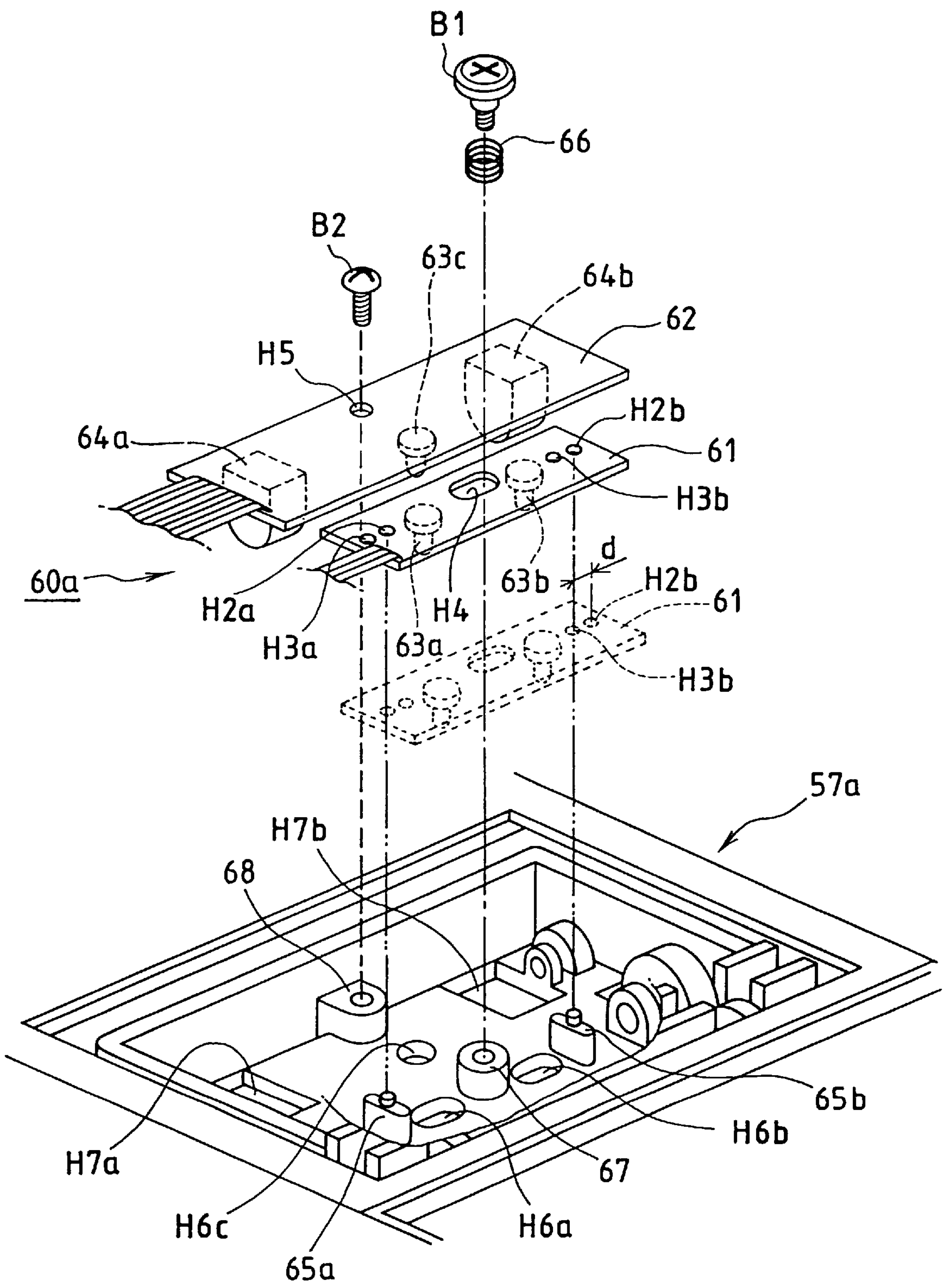
FIG. 11 is an exploded view of a front-side sensor section and an attachment section therefor in the bill identifying apparatus of FIG. 7.

When the first sensor board 61 in the position indicated by full line in FIG. 11 is brought plumb down, its first pair of mounting holes H2a and H2b are situated in positions so that they can engage the guide bosses 65a and 65b, respectively. Likewise, when the sensor board 61 in the position indicated by broken line in FIG. 11 is brought plumb down, its second pair of mounting holes H3a and H3b are situated in positions so that they can engage the guide bosses 65a and 65b, respectively. Thus, the position of the first sensor board 61 indicated by full line is shifted toward the left side by the longitudinal distance d from the position of the sensor board 61 indicated by broken line.

As described above, the first sensor board 61 can selectively be mounted in a first position on the attachment section 57a or a second position at the longitudinal distance d therefrom. Regardless of whether the sensor board 61 is in the first position or in the second position, the light beams emitted from the light emitting elements 63a and 63b thereon can pass through the slots H6a and H6b, respectively, in the attachment section 57a. The slot H4 has a length such that the first sensor board 61 is allowed to move freely between the first and second positions when the mounting screw B1 in the tapped hole of the screw bearing portion 67 is passed through the slot H4.

The second sensor board 62 is fitted with the pair of magnetic heads 64a and 64b that are arranged leaving a certain space. Also, the sensor board 62 is fitted with the light emitting element 63c in an intermediate position between the magnetic heads 64a and 64b. The second sensor board 62 is fixed to the attachment section 57a in a manner such that a mounting screw B2 is passed through a mounting hole H5 and driven into a tapped hole in a screw receiving portion 68 of the attachment section 57a. On the other hand, the attachment section 57a is provided with holes H7a, H7b and H6c in positions opposite to the magnetic heads 64a and 64b and the light emitting element 63c, respectively. The magnetic heads 64a and 64b are located so as to project into the bill transfer path 36 through the holes H7a and H7b, respectively (see FIG. 10). A light beam emitted from the light emitting element 63c is made to be incident on the path 36.

Conductor wires that are connected to the magnetic heads 64a and 64b and the light emitting elements 63a to 63c are joined together by a relay harness (not shown), which is coupled to a connector (not shown) on the attachment section 57a, whereby the conductor wires are connected electrically to the control board 16.

Figure 9:
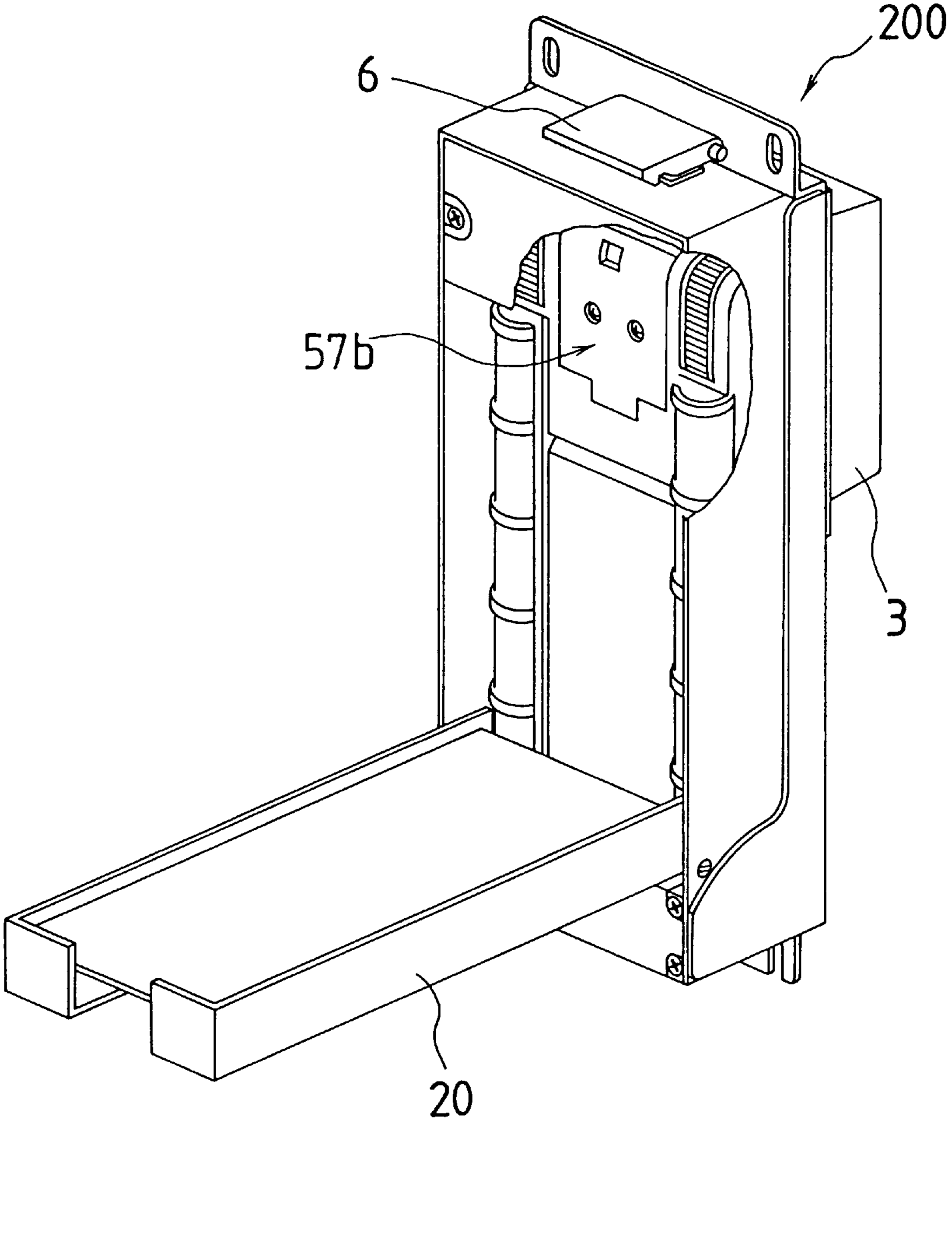
FIG. 9 is a perspective view of the bill identifying apparatus of FIG. 7 with its bill storage section open.

On the other hand, as shown in FIG. 8, a bill storage section 20 is attached to the back of the bill identifying apparatus body 2, and is latched and closed by means of a latch mechanism 19. When the latch mechanism 19 is operated to release a latch, the storage section 20 is opened by tilting around the pivotal portion (not shown) at its lower end, as shown in FIG. 9. On the rear side of the apparatus body 2, as shown in FIG. 9, an attachment section 57b for a rear-side sensor section 60b is provided in a position opposite to the attachment section 57a of the front-side sensor section 60a.

Figure 12:
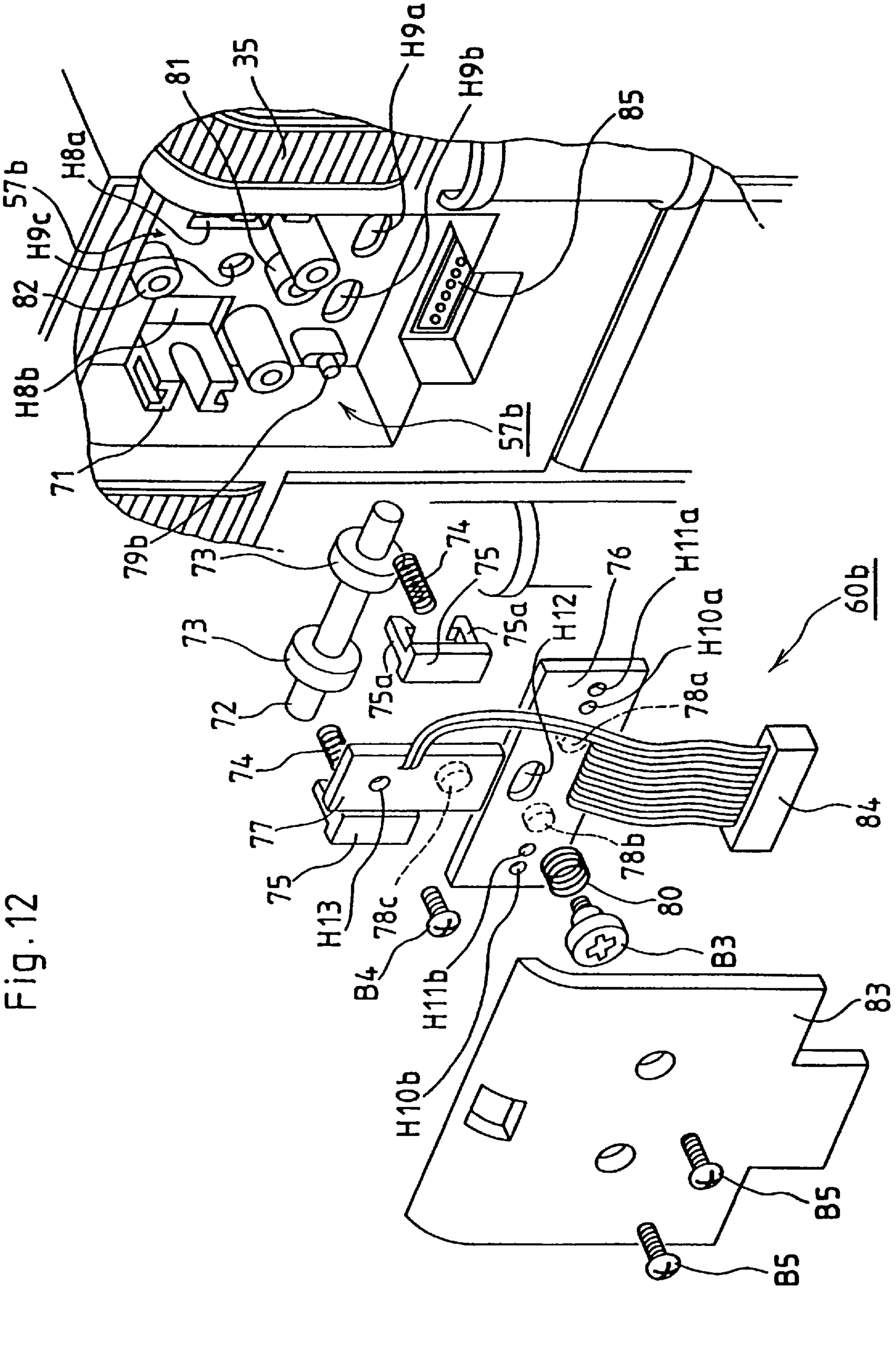
FIG. 12 is an exploded view of a rear-side sensor section and an attachment section therefor in the bill identifying apparatus of FIG. 7.

Referring now to the exploded view of FIG. 12, the rear-side sensor section 60b and the attachment section 57b therefor will be described.

The rear-side sensor section 60b is composed of a third and a fourth sensor boards 76 and 77, the third sensor board 76 being fitted with two light receiving elements (phototransistors) 78a and 78b that are arranged leaving a predetermined space, and the fourth sensor board 77 being fitted with one light receiving element 78c. From the attachment section 57b, on the other hand, protrude a pair of guide bosses 79a and 79b (only the one boss 79b is shown in FIG. 12), which are arranged leaving a predetermined space.

The attachment section 57b for the rear-side sensor section 60b is formed in a position opposite to the attachment section 57a for the front-side sensor section 60a, with the bill transfer path 36 (see FIG. 10) interposed therebetween. The bottom face (opposite to the front-side sensor section 60a) of the attachment section 57b is provided with holes 118a and H8b located in positions opposite to the magnetic heads 64a and 64b, that constitute the front-side sensor section 60a, and holes H9a, H9b and H9c located in positions opposite to the light emitting elements 63a, 63b and 63c, that constitute the sensor section 60a.

Further, adjoining the two holes H8a and H8b, a pair of shaft guides 71 (one of which is not shown in FIG. 12) are set up on the attachment section 57b. Each shaft guide 71 is formed with a groove in which a shaft 72 can be loosely fitted. The shaft 72 is provided with a pair of backup rollers 73. When the shaft 72 is fitted in the respective grooves of the shaft guides 71, the rollers 73 face the magnetic heads 64a and 64b, respectively, that constitute the front-side sensor section 60a.

The shaft 72 is supported in the respective grooves of the shaft guides 71 by means of a pair of shaft brackets 75 through a pair of backup springs 74. Each shaft bracket 75 has an elastically deformable claw 75a on each end thereof. Each claw 75a is fixed to its corresponding shaft guide 71 by engaging with an engaging hole therein, whereby the shaft 72 is pressed toward the magnetic heads 64a and 64b by the backup springs 74. As a result, the magnetic head backup rollers 73 are exposed to the bill transfer path through the holes H8a and H8b, and press their corresponding magnetic heads 64a and 64b as they rotate.

The light receiving elements 78a and 78b mounted on the third sensor board 76 receive light beams from the light emitting elements 63a and 63b, respectively, that are mounted on the first sensor board 61 of the front-side sensor section 60a. The third sensor board 76, like the first sensor board 61, is formed with a first pair of engaging holes H10a and H10b, which are arranged leaving a space equal to the space between the guide bosses 79a and 79b, and a second pair of engaging holes H11a and H11b, which are arranged leaving a space equal to the space between the holes H10a and H10b and shifted by the given distance d therefrom in one direction.

Thus, the third sensor board 76 is alternatively mounted either in a first position on the attachment section 57b or a second position at the longitudinal distance d therefrom, depending on whether the first sensor board 61 is in its first position or in the second position.

A mounting screw B3 is passed through a slot H12 and a spring 80, being either a coil spring or leaf spring, and is driven into a tapped hole in a screw receiving portion 81 of the attachment section 57*b*. Thereupon, the third sensor board 76 is attached to the attachment section 57*b*, and is held in position by the urging force of the spring 80. The slot H12 has a length such that the third sensor board 76 is allowed to move freely between the first and second positions when the mounting screw B3 in the tapped hole of the screw receiving portion 81 is passed through the slot H12.

The fourth sensor board 77 is formed with a mounting hole H13, and is fixed to the attachment section 57*b* by passing a mounting screw B4 through the hole H13 and driving it into a tapped hole in a screw receiving portion 82 of the attachment section 57*b*. When the fourth sensor board 77 is fixed to the attachment section 57*b*, the light receiving element 78*c* mounted on the board 77 can receive the light beam from the light emitting element 63*c* that is mounted on the second sensor board 62 of the front-side sensor section 60*a*.

Further, a sensor cover 83 can be attached to the attachment section 57*b* by means of a pair of mounting screws B5. Conductor wires that are connected to the light receiving elements 78*a*, 78*b* and 78*c* are joined together by means of a relay harness 84, which is coupled to a connector 85 on the attachment section 57*b*. Thus, the wires are connected electrically to the control board 16.

Figure 13:
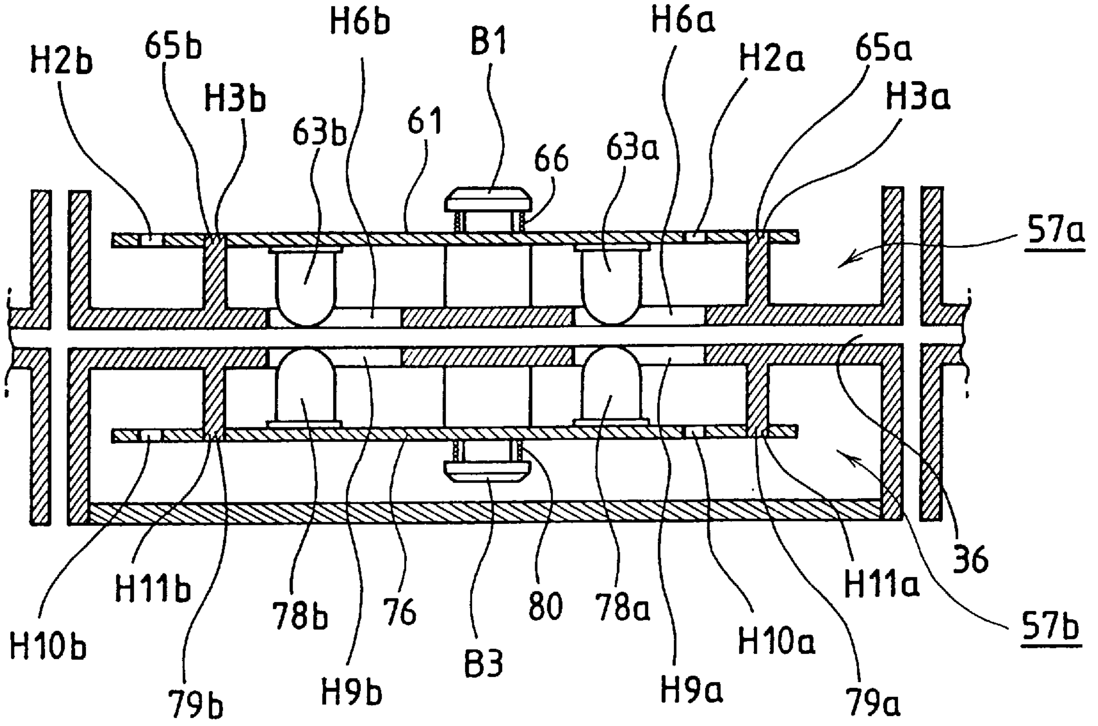
FIG. 13 is a sectional view of the sensor sections showing the way in which light emitting elements and light receiving elements face one another with sensor boards in the bill identifying apparatus of FIG. 7 fixed in one position.
Figure 14:
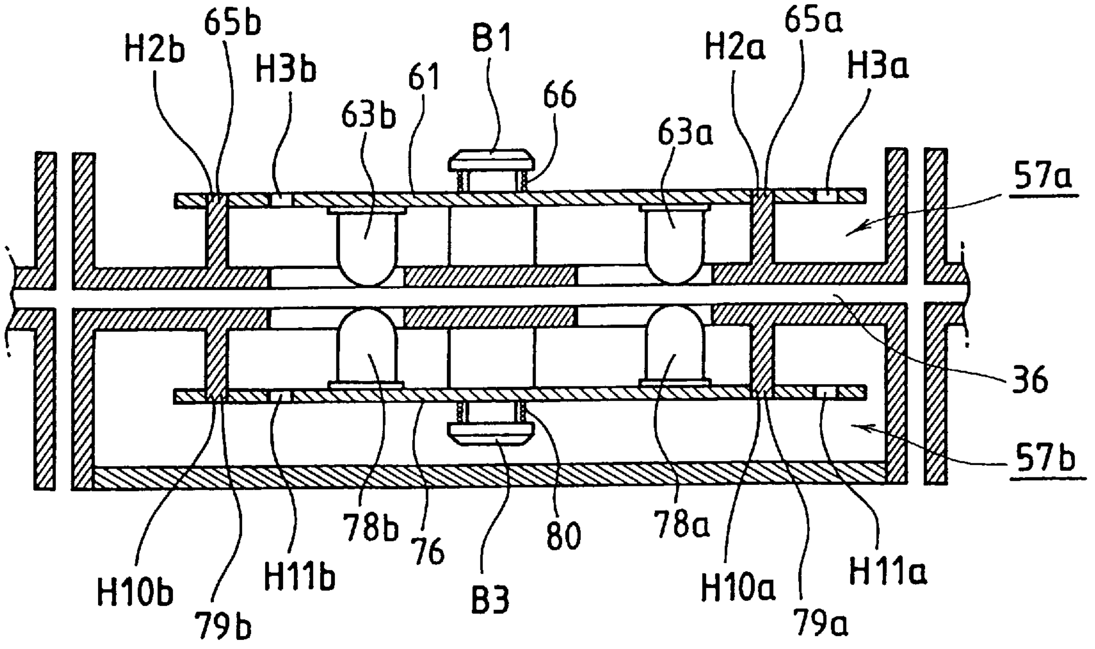
FIG. 14 is a sectional view of the sensor sections showing the way in which the light emitting elements and the light receiving elements face one another with the sensor boards in the bill identifying apparatus of FIG. 7 fixed in the other position.

Referring now to FIGS. 13 and 14, the way the light emitting elements 63*a* and 63*b* and the light receiving elements 78*a* and 78*b* face one another will be described.

In FIG. 13, the second pair of engaging holes H3*a* and H3*b* of the first sensor board 61 are respectively in engagement with the guide bosses 65*a* and 65*b* of the attachment section 57*a*, while the second pair of engaging holes H11*a* and H11*b* of the third sensor board 76 are respectively in engagement with the guide bosses 79*a* and 79*b* of the attachment section 57*b*.

The light emitting elements 63*a* and 63*b* on the first sensor board 61 are exposed respectively to the bill transfer path 36 through the slots H6*a* and H6*b* in the attachment section 57*a*. Also, the light receiving elements 78*a* and 78*b* on the third sensor board 76 are exposed respectively to the bill transfer path 36 through the slots H9*a* and 119*b* in the attachment section 57*a*. Exposed to the path 30 in this manner, the light emitting elements 63*a* and 63*b* face the light receiving elements 78*a* and 78*b*, respectively. As a result, the light beams from the emitting elements 63*a* and 63*b* are transmitted through each bill transfered in the bill transfer path 36, and are received by the receiving elements 78*a* and 78*b*, respectively. Patterns of the received light quantities are detected as identification data, and the bill is checked for authenticity and denomination on the basis of these identification data.

The light emitting elements 63*a* and 63*b* and the light receiving elements 78*a* and 78*b*, arranged in the manner shown in FIG. 13, define positions for detecting the light beams transmitted through each bill, that is, bill identification lines. These identification lines can be changed by carrying out the following operation. The first sensor board 61 is pulled away from the bill transfer path 36 in the axial direction of the mounting screw Bi, resisting the urging force of the spring 66, whereby its engaging holes H3*a* and H3*b* are disengaged respectively from the guide bosses 65*a* and 65*b* of the attachment section 57*a*. Then, the first sensor board 61 is moved towards the right of FIG. 13 so that the guide bosses 65*a* and 65*b* of the attachment section 57*a* engage the alternative engaging holes H2*a* and H2*b*, respectively. Likewise, the third sensor board 76 is pulled away from the transfer path 36 in the axial direction of the mounting screw B3, resisting the urging force of the spring 80, whereby its engaging holes H11*a* and H11*b* are disengaged respectively from the guide bosses 79*a* and 79*b* of the attachment section 57*b*. Then, the third sensor board 76 is moved towards the right of FIG. 13 so that the guide bosses 79*a* and 79*b* of the attachment section 57*b* engage the alternative engaging holes H10*a* and H10*b*, respectively. In consequence, the relative positions of the first and third sensor boards 61 and 76 of the attachment sections 57*a* and 57*b* are shifted from the ones shown in FIG. 13 to the ones shown in FIG. 14, whereupon the bill identification lines are changed.

Referring now to FIG. 10, the operation of the bill identifying apparatus 200 will be described briefly. When insertion of a bill through the bill slot 3*a* is detected, a bill transfering section 40 of the bill identifying apparatus 20 starts to operate, causing driving conveyor belts 35 (see FIG. 12), a transfer roller 88 (see FIG. 7), etc. to be driven to transfer the bill along the transfer path. The bill passes between the light emitting elements 63*a*, 63*b* and 63*c* and the light receiving elements 78*a*, 78*b* and 78*c*, and is pressed against the magnetic heads 64*a* and 64*b* by the magnetic head backup rollers 73 as it is transfered. During this transfer process, the light receiving elements 78*a*, 78*b* and 78*c* receive light beams emitted respectively from the light emitting elements 63*a*, 6*b* and 63*c* and transmitted through the bill, and the magnetic heads 64*a* and 64*b* detect the magnetism of the bill. As a result, identification data, on patterns of the quantities of received light for those lines on the bill along the transfer path, which correspond to the respective positions of the light receiving and emitting elements, are obtained from the light receiving elements 78*a*, 78*b* and 78*c*. The magnetic heads 64*a* and 64*b* also obtain identification data on magnetic patterns for the lines on the bill in the corresponding positions. The identification data are delivered to the microchip computer 17. The microchip computer 17 is previously stored with reference data based on received light quantity patterns and magnetic patterns detected in authentic bills. Based on the detected identification data and the reference data, the computer 17 checks each bill for authenticity.

The resulting conclusion is outputted before the trailing end of the bill passes the position of a stopper lever 41. If the bill is concluded to be unfit or false, the feed of transfering means of the bill transfering section 40 is reversed so that the bill is fed back toward the bill slot. If the bill is concluded to be fit or authentic, on the other hand, it is transfered directly to the bill storage section 20. When the bill reaches the storage section 20, bill storing means 42 starts to operate, thereby storing the bill into the storage section 20.

The bill transfering means, bill storing means, and the method to check bills for authenticity by microchip computer 17 are the same as in the conventional bill identifying apparatus. Therefore, a detailed description of the constructions and operations of these means is omitted.

According to the present embodiment, however, the bill inspecting positions (identification lines) for the light emitting elements 63*a* and 63*b* and the light receiving elements 78*a* and 78*b* vary depending on selected mounting positions for the first and third sensor boards 61 arid 76 on the attachment sections 57*a* and 57*b*. Therefore, reference data corresponding to the mounting positions of the first and third sensor boards 61 and 76 are stored in advance in the microchip computer 17, and are selected in accordance with the mounting positions.

Figure 15:
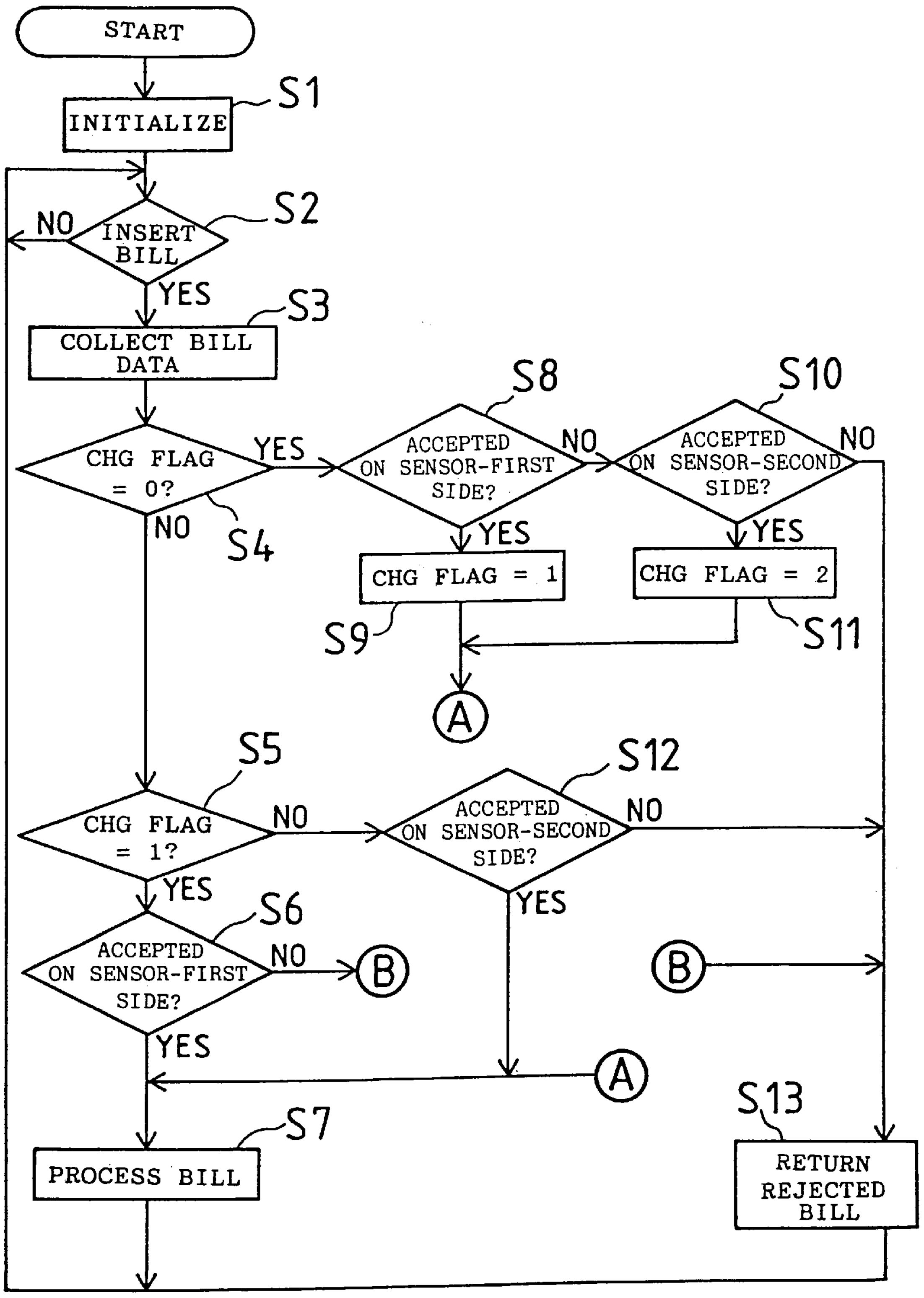
FIG. 15 is a flowchart showing processes for specifying and storing reference data in the bill identifying apparatus according to the second embodiment of the invention.

Referring now to the flowchart of FIG. 15, a process for the microchip computer 17 to select the reference data automatically and a bill discriminating process will be described. In this flowchart, the case in which the first and third sensor boards 61 and 76 are mounted in the state shown in FIG. 13 is called sensor-first side, while the case in which the sensor boards 61 and 76 are mounted in the state shown in FIG. 14 is called sensor-second side.

When the bill identifying apparatus 200 is turned on, an initialization process is executed, whereupon a CHG flag (mentioned later) for specifying the reference data is set to "0" (Step S1). Then, an authentic bill is inserted through the bill slot 3*a* in order to select the reference data. The bill identifying apparatus 200, like the conventional one, detects the insertion of the bill by means of an optical sensor or the like that is located in the vicinity of the inlet slot 3*a*. If the insertion of the bill is detected (Step S2), identification data detected by means of the magnetic heads 64*a* and 64*b* and the light receiving elements 78*a* to 78*c* are collected in the same manner as in the conventional case (Step S3), and it is determined whether or not the CHG flag is "0" (Step S4). Since the CHG flag is set to "0" in the initialization process executed when the power is turned on, as mentioned before, the program proceeds to Step S8, whereupon the inserted bill is checked for authenticity by comparing the detected data with the reference data on the sensor-first side stored bill a memory of the microchip computer 17. If the bill is concluded to be authentic, the CHG flag is set to "1" (Step S9), and the program proceeds to Step S7, whereupon bill processing is carried out in the same manner as in the conventional case. More specifically, the bill is transfered to the bill storage section 20, and the bill storing means 42 is actuated to store the bill in the storage section 20. Thereafter, the program returns to Step 2, whereupon the machine is ready to receive a bill.

On the other hand, if the detected data are not conforming to reference data on the sensor-first side; that is, if the bill is not concluded to be authentic in Step S8, the program proceeds to Step S10, whereupon the bill is check for authenticity by being compared with reference data on the sensor-second side. If the bill is concluded to be authentic, the CHG flag is set to "2", and (step S11) the program proceeds to Step S7. If the bill is not concluded to be authentic in Step S10, an inserted bill returning process is executed in the same manner as in the conventional case (Step S13), whereupon the bill is returned to the bill slot 3*a*. If the bill is returned, another authentic bill is inserted, and the processes of Step S2 and the subsequent steps are executed again until the bill is taken into the bill storage section 20 without being returned.

When the bill is not returned, this implies that the CHG flag is set to "1" or "2", so that from this point on, the automatic vending machine or other apparatus to which the bill identifying apparatus 20 is attached is ready for vending operation.

If a bill is inserted with the CHG flag set to "1" or "2" in this manner, the processes of Steps S2, S3 and S4 are executed. Since the CHG flag is not concluded to be "0" in Step S4, the program proceeds to Step S5. If the CHG flag is "1", the bill is checked for authenticity by being compared with the reference data on the sensor-first side (Step S6). If the CHG flag is not "1" (or is "2"), the bill is checked for authenticity by being compared with the reference data on the sensor-second side (Step S12). When the bill is concluded to be authentic as a result of the bill checking, the program proceeds to Step S7, whereupon the bill is stored in the bill storage section, and a permission signal for vending is delivered to the automatic vending machine or the like. When the conclusion is negative (indicative of inconformity to the reference data), the program proceeds to Step S13, whereupon the bill is returned.

If a counterfeit bill is detected while the bill identifying apparatus 200 is in operation, the mounting positions of the first and third sensor boards 61 and 76 are changed. If the sensor boards are mounted on the sensor-first side shown in FIG. 13, they are shifted to the sensor-second side shown in FIG. 14, and vice versa.

First, the latch mechanism 6 is released to disengage the bill identifying apparatus body 2 from the mounting plate 1, to the extent of the state shown in FIG. 13. In this state, the first sensor board 61 is lifted to disengage the engaging holes (H2*a* and H2*b* or H3*a* and H3*b*) respectively from the guide bosses 65*a* and 65*b*, and is moved so that the alternative pair of engaging holes engage the bosses 65*a* and 65*b*. Then, the identifying apparatus body 2 is closed or joined to the mounting plate 1 and latched by means of the latch mechanism 6, whereupon the state shown in FIG. 8 is established. Further, the latch mechanism 19 is released to open the bill storage section 20, as shown in FIG. 14, and the sensor cover 83 is removed. In this state, the third sensor board 76 is lifted to disengage the engaging holes (H10*a* and H10*b* or H11*a* and H11*b*) respectively from the guide bosses 65*a* and 65*b*, and is moved so that the alternative pair of engaging holes engage the bosses 65*a* and 65*b*. Then, the sensor cover 83 is restored, the bill storage section 20 is closed and latched by means of the latch mechanism 19, and the power source of the bill identifying apparatus 200 is turned on. In this state, an authentic bill is inserted, the processing shown in FIG. 15 is executed, and the reference data are selected (or the CHG flag is changed), whereupon the changeover operation is finished.

In this manner, the respective positions of the first and third sensor boards 61 and 76 can be shifted from the ones shown in FIG. 13 to the ones shown in FIG. 14 or vice versa.

Since the positions of either the first or third sensor boards 61 and 76 can be selected, the position (line) of the bill for detecting the identification data at the previous positions of the light emitting elements 63*a* and 63*b* and the light receiving elements 78*a* and 78*b* can be changed, so that the bill can be checked for authenticity based on the light quantity patterns detected at the changed bill position. Thus, even if a counterfeit bill has been received as an authentic one before the identification position (line) is changed, it can be removed as a rejectable one when the identification position is changed.

In this way, the bill identification position (line) can be changed for bill identification by simple operation without removing the bill identifying apparatus from the automatic vending machine or the like, so that use of a counterfeit bill can easily be prevented on the site of installation.

According to the embodiment described above, the first and third sensor boards 61 and 76 are attached to the attachment sections 57*a* and 57*b*, respectively, in a manner such that the guide bosses and the engaging holes are made to engage one another, and the boards are pressed by means of the springs 66 and 80 and fixed by means of the mounting screws B1 and B3. Thus, the respective positions of the sensor boards 61 and 76 can be changed by simply lifting the boards against the urging force of the springs 66 and 80 without using a screwdriver or any other tool. Alternatively, however, the first and third sensor boards 61 and 76 may be fixedly attached to the attachment sections 57*a* and 57*b*, respectively, by means of mounting screws. In this case, it is necessary only that the respective positions of tapped holes to mate with the screws be varied to change the bill identification position (line). Further, the sensor boards may be designed so that they are slidable and can be fixed by click motion.

Furthermore, the pairs of engaging holes provided in the first and third sensor boards 61 and 76 may be increased in number so that the positions of sensor boards can be shifted for three or more positions.

Also, the second sensor board 62 fitted with the magnetic heads and the fourth sensor board 77 may be designed so that their respective positions can be changed like the cases of the first and the third sensor boards. In this case, the shaft having the magnetic head backup rollers 73 that face the magnetic heads, individually, may be made to be replaceable. Alternatively, however, the width (length in the axial direction of the shaft) of each backup roller 73 may be simply increased so that each corresponding magnetic head can be kept pressed against the roller despite the change of its position of the magnetic head. Further, the first and second sensor boards 61 and 62 and the third and fourth sensor boards 76 arid 77 may be formed integrally with one another so that their respective locations are changeable. Further, to specify the reference data according to the embodiment described above, the CHG flag is set to "0" so that the reference data are left unspecified in the initialization process to be executed when the power is turned on. However, the CHG flag may be is set to "0" by providing a dedicated switch or command for the purpose. In this case, if the CHG flag is previously stored in a nonvolatile memory or the like, reference data corresponding to the current positions of the sensor boards can be specified and stored even when the power source of the bill identifying apparatus is turned off. Therefore, when the power source is turned on again, the reference data need not be specified (by setting the CHG flag to "1" or "2") by inserting an authentic bill. Also, the reference data may be manually selected by means of a switch or the like. More specifically, a switch for selecting the reference data may be designed to be adjustable to 1, 2, 3, . . . , depending on the positions of the sensor sections (sensor board positions).

According to the second embodiment of the present invention, as described above, the respective positions of the sensor sections can easily be changed so that the position (line) of the bill at which the identification data is detected by means of the sensor sections can be varied. Therefore, the countermeasure against the use of a counterfeit bill can be taken with ease.

Furthermore, like the ones according to the first embodiment, the front- and rear-side sensor sections 60*a* and 60*b* may be unitized into front- and rear-side sensor units, respectively, and the mounting positions of these sensor units on the attachment sections 57*a* and 57*b* may be made selectable from among a plurality of choices. By doing so, a plurality of positions can be selected for the detection of the bill identification data.

What is claimed is:

1. A bill identifying apparatus comprising a sensor section for obtaining identification data from part of the whole area of a bill, the sensor section being removably mounted on the body of the bill identifying apparatus in a manner such that a mounting position of the sensor section is changeable, and wherein said sensor section is divided into two units, that is, a front-side sensor unit located on the front side of a bill transfer path in the bill identifying apparatus body and a rear-side sensor unit located on the rear side, both the front- and rear-side sensor units being removably mounted on the bill identifying apparatus body, whereby a region for obtaining the identification data from the bill passing through a bill transfer path in the bill identifying apparatus body can be changed.

2. A bill identifying apparatus according to claim 1, wherein said bill identifying apparatus body is contained in a housing, the front and rear sides of the housing being independently openable so that the front-side sensor unit can be attached to or detached from the identifying apparatus body when a front-side portion of the housing is opened arid that the rear-side sensor unit can be attached to or detached from the identifying apparatus body when a rear-side portion of the housing is opened.

3. A bill identifying apparatus comprising:

a sensor section for obtaining identification data from part of the whole area of a bill, the sensor section being removably mounted on the body of the bill identifying apparatus in manner such that a mounting position of the sensor section is changeable, whereby a region for obtaining the identification data from the bill passing through a bill transfer path in the bill identifying apparatus body can be changed, wherein said sensor section is divided into two units, that is, a front side sensor unit located on the front side of a bill transfer path in the bill identifying apparatus body and a rear-side sensor unit located on the rear side, both the front- and rear-side sensor units being removably mounted on the bill identifying apparatus body and wherein said front-side of said body is a mounting plate of the bill identifying apparatus.

4. A bill identifying apparatus comprising:

a sensor section for obtaining identification data from part of the whole area of a bill, the sensor section being removably mounted on the body of the bill identifying apparatus in a manner such that a mounting position of the sensor section is changeable, whereby a region for obtaining the identification data from the bill passing through a bill transfer path in the bill identifying apparatus can be changed, wherein said sensor section is divided into two units, that is, a front-side sensor unit located on the front side of a bill transfer path in the bill identifying apparatus body and a rear-side sensor unit located on the rear side, both the front- and rear-side sensor units being removably mounted on the bill identifying apparatus body and wherein said rear-side of said body is a bill storage section of the bill identifying apparatus.

5. A bill identifying apparatus comprising a unitized sensor section for obtaining identification data from a bill, the sensor section being removably mounted on the body of the bill identifying apparatus, and wherein a plurality of types of said unitized sensor sections are provided in advance, and said sensor sections are provided respectively with reference data to be compared with the identification data obtained from the bill by tie sensor sections when verifying the authenticity of the bill, the reference data being selected corresponding to the sensor sections attached to the bill identifying apparatus body.

6. A bill identifying apparatus comprising:

a unitized section for unitized sensor section for obtaining identification ata for a bill, the sensor section being removably mounted on the body of the bill identifying apparatus, wherein a plurality of types of said unitized sensor sections are provided in advance, said sensor sections are provided respectively with reference data to be compared with the identification data obtained from the bill by the sensor sections when verifying the authenticity of the bill, the reference data being selected corresponding to the sensor sections attached to the bill identifying apparatus body and said plurality of kinds of reference data are stored in a control device of the bill identifying apparatus, corresponding individually to the sensor sections.

7. A bill identifying apparatus comprising a unitized sensor section for obtaining identification data from a bill, the sensor section being removably mounted on the body of the bill identifying apparatus, wherein a plurality of types of said unitized sensor sections are provided in advance, said sensor sections are provided respectively with reference data to be compared with the identification data obtained from the bill by the sensor sections when verifying the authenticity of the bill, the reference data being selected corresponding to the sensor sections attached to the bill identifying apparatus body and said plurality of kinds of reference data are individually in storage elements removably mounted in the bill identifying apparatus body.

8. A bill identifying method comprising:

units sensor sections for detecting bill identification data on a bill identifying apparatus, thereby making said sensor units removably attached to the bill identifying apparatus, the sensor units being designed to be varied in number or in position for detecting the identification data in a bill;

replacing the sensor units attached to the bill identifying apparatus whenever necessary; and identifying the bill in a manner such that reference data for checking the bill for authenticity based on the detected identification data are selected, corresponding to the attached sensor units from among reference data previously stored corresponding to the sensor units, or that an electronic component stored with reference data is replaced with one stored with reference data corresponding to the attached sensor units.

9. A bill identifying apparatus comprising:

a sensor section for detecting bill identification data;

an attachment section to be fitted with the sensor section; and a mechanism provided between the sensor section and the attachment section and capable of selecting a plurality of mounting positions for the sensor section on the attachment section, whereby a plurality of positions can be selected for the detection of the bill identification data.

10. A bill identifying apparatus according to claim 9, wherein said sensor section includes one or more sensors mounted on one board, the board being designed for being fixed in a plurality of mounting positions on the attachment section.

11. A bill identifying apparatus according to claim 9, wherein said sensor section is composed of a first group of sensors arranged on the front side of a bill transfer path facing the path and a second group of sensors arranged on the rear side of the transfer path facing the path, the first and second groups of sensors being unitized individually so that the unitized sensor section can selectively be mounted in a plurality of mounting positions on the attachment section.

12. A bill identifying apparatus comprising:

a sensor section for detecting bill identification data;

an attachment section to be fitted with the sensor section; and a mechanism provided between the sensor section and the attachment section and capable of selecting a plurality of mounting positions for the sensor section on the attachment section, whereby a plurality of positions can be selected for the detection of the bill identification data; and wherein said sensor section includes one or more sensors mounted on one board, the board being designed for being fixed in a plurality of mounting positions on the attachment section; and said attachment section has at least two guide bosses protruding therefrom, and said board has a first group of engaging holes capable of individually engaging the guide bosses in a first position and a second group of engaging holes capable of individually engaging the guide bosses in a second position different from the first position.

13. A bill identifying apparatus comprising:

a sensor section for detecting bill identification data;

an attachment section to be fitted with the sensor section; and a mechanism provided between the sensor section and the attachment section and capable of selecting a plurality of mounting positions for the sensor section on the attachment section, whereby a plurality of positions can be selected for the detection of the bill identification data; and wherein said sensor section includes one or more sensors mounted on one board, the board being designed for being fixed in a plurality of mounting positions on the attachment section; and wherein control means of said bill identifying apparatus is previously stored with reference data for checking a bill for authenticity corresponding to the mounting positions for the sensor sections, the bill is in inserted into the bill identifying apparatus with the reference data unspecified, the bill is checked for authenticity based on the reference data corresponding to the mounting positions for the sensor section so that the reference data by which the bill is concluded is to be authentic or identified, and the identified reference data are used to check subsequent inserted bills for authenticity.

* * * * *

UNITED STATES PATENT AND TRADEMARK OFFICE

CERTIFICATE OF CORRECTION

PATENT NO. : 5,964,336
DATED : October 12, 1999
INVENTOR(S) : Eiji Itako, et al.

It is certified that error appears in the above-indentified patent and that said Letters Patent is hereby corrected as shown below:

Item [30] Foreign Application Priority Data:

Change "Jul. 15, 1996 [JP] Japan ....... 8-202824
Jul. 15, 1996 [JP] Japan ....... 8-204150"
to --Jul. 15, 1996 [JP] Japan ....... 8-202824
Jul. 16, 1996 [JP] Japan ....... 8-204150--

Signed and Sealed this

Twenty-fifth Day of April, 2000

Attest:

Q. TODD DICKINSON

*Attesting Officer*

*Director of Patents and Trademarks*